United States Patent [19]

Mäenpää

[11] Patent Number: 5,557,654
[45] Date of Patent: Sep. 17, 1996

[54] SYSTEM AND METHOD FOR AUTHENTICATING SUBSCRIBERS OF A TRANSMISSION NETWORK AND SUBSCRIPTION, HAVING DIFFERING AUTHENTICATION PROCEDURES, USING A COMMON AUTHENTICATION CENTER

[75] Inventor: Sanna Mäenpää, Espoo, Finland

[73] Assignee: Nokia Telecommunications Oy, Espoo, Finland

[21] Appl. No.: 137,123

[22] PCT Filed: Feb. 23, 1993

[86] PCT No.: PCT/FI93/00063

§ 371 Date: Oct. 20, 1993

§ 102(e) Date: Oct. 20, 1993

[87] PCT Pub. No.: WO93/17529

PCT Pub. Date: Sep. 2, 1993

[30] Foreign Application Priority Data

Feb. 24, 1992 [FI] Finland ................................ 920792

[51] Int. Cl.⁶ .................................................. H04Q 7/20
[52] U.S. Cl. .......................... 379/58; 379/89; 380/21; 380/23; 455/33.1
[58] Field of Search ............................ 379/58, 59, 89; 380/21, 23; 455/33.1

[56] References Cited

U.S. PATENT DOCUMENTS

| | | | |
|---|---|---|---|
| 4,761,807 | 8/1988 | Matthews et al. | 379/89 |
| 5,020,093 | 5/1991 | Pireh | 379/58 |
| 5,241,598 | 8/1993 | Raith | 380/21 |
| 5,260,987 | 11/1993 | Mauger | 379/58 |
| 5,337,344 | 8/1994 | Alvesalo | 379/58 |

FOREIGN PATENT DOCUMENTS

| | | |
|---|---|---|
| 2257334 | 1/1993 | United Kingdom . |
| 9015488 | 12/1990 | WIPO . |
| 9307721 | 4/1993 | WIPO . |

OTHER PUBLICATIONS

Ballard, Issenmann, Sanchez, "Cellular Mobile Radio as an Intelligent Network Application", vol. 63 Nov. 4, 1989.

Ballard, Issenmann, "Digital Cellular Mobile Radio System ECR 900", European Transactions on Telecommunications Jan. 1990.

Goodman, "Trends in Cellular and Cordless Communications", IEEE Communications Magazine, Jun. 1991.

Evans, M. W., "CT2 Common Air Interface", *British Telecommunications Engineering*, vol. 9, Jul. 1990. pp. 103–111.

*Primary Examiner*—Curtis Kuntz
*Assistant Examiner*—William Cumming
*Attorney, Agent, or Firm*—Cushman, Darby & Cushman, L.L.P.

[57] ABSTRACT

A telecommunication system and a method for authenticating a subscriber in a telecommunication system. The system includes a transmission network having subscriber identity codes of a first format and a first subscriber authentication procedure. An exchange of the transmission network is connected to a subsystem having subscriber identity codes of a second format and a second subscriber authentication procedure. The calls of the subscribers of the subsystem are routed through the transmission network and the exchange. The authentication of both subscriber types is enabled in the transmission network by locating the parameter generation algorithms of both the first and the second authentication procedure in a transmission network authentication center. The proper algorithm for each subscriber to be authenticated is selected on the basis of the type of the subscriber.

5 Claims, 3 Drawing Sheets

SYSTEM AND METHOD FOR AUTHENTICATING SUBSCRIBERS OF A TRANSMISSION NETWORK AND SUBSCRIPTION, HAVING DIFFERING AUTHENTICATION PROCEDURES, USING A COMMON AUTHENTICATION CENTER

FIELD OF THE INVENTION

The invention relates a subscriber authentication method in a telecommunication system comprising a transmission network having subscriber identity codes of a first format, a first subscriber authentication procedure and at least one exchange; a subsystem connected to said exchange and having subscriber identity codes of a second format and a second subscriber authentication procedure, the calls of the subscribers of the subsystem being routed through the transmission network and said exchange, the method comprising the steps: the transmission network sends an authentication message containing a first authentication parameter to the subscriber through the exchange; the subscriber generates a second authentication parameter in response to the received first authentication parameter and sends it through the exchange as an authentication response to the transmission network, and the transmission network compares the second authentication parameter generated by the subscriber with a corresponding reference parameter and regards the subscriber as correctly authenticated if the second authentication parameter and the reference parameter are equal.

BACKGROUND OF THE INVENTION

Cordless telephone (CT) systems, such as the digital cordless telephone system CT2, have recently been introduced into the market. Such systems comprise a base station intended to be connected to a public switched telephone network (PSTN). There are three different types of base stations: a residential (home) base station, a base station connected to a private branch exchange (PBX) in an office or configured to operate as a PBX, and telepoint base stations, by means of which outward calls only are possible for a CT telephone.

As the present-day CT systems are regarded as PSTN subscriber connections (access points in PSTN), a call is addressed to the CT terminal equipment in a normal way by dialing a telephone number in accordance with the PSTN numbering scheme. On the basis of the telephone number the PSTN thereby routes the call to a respective subscriber connection to which the CT residential base station or the PBX of the CT office base station is connected. The base station pages the CT terminal equipment over the radio path by means of an identity code determined by the numbering scheme of the CT system, and sets up a call when the terminal equipment responds. In practice, it is thus possible to make a call to the CT terminal equipment only through its residential or office base stations (through predetermined subscriber connections).

Accordingly, the numbering schemes of the present CT systems themselves serve only the CT radio link and are not utilized anywhere in the PSTN.

In the future it may become advantageous to be able to connect CT systems even to mobile radio networks. As there are no addressable access points (such as PSTN subscriber connections) but only common traffic channels shared by all mobile subscriber equipments in the mobile radio network, the setup of a call is always based on the use of an identity code assigned to the subscriber equipment.

A problem therewith is, however, that the numbering schemes specified for the cordless telephone system and for the mobile radio system are usually quite different and incompatible. Integrating such systems would require matching of the numbering schemes.

In FI Patent Application 914655, to solve this problem, a unique subscriber identity code for the fixed transmission network can be derived from the binary subscriber identity code of the CT system by a simple algorithm at the system interfaces or the same CT subscriber identity code can be restored by an inverse algorithm.

In the mobile radio network, the subscriber identification or authentication is performed at least in connection with the registration to the base station and the call setup. Correspondingly, the authentication procedure is usually performed in the CT systems at least in connection with the call setup. A problem with the integration of the CT system and the mobile radio system is that their authentication procedures differ from each other and cannot be altered or interconnected so as to be compatible.

SUMMARY OF THE INVENTION

One object of the invention is to eliminate the above-mentioned problem.

This is achieved by means of a method of the type disclosed in the Background section of this specification, which according to the invention is characterized in that the transmission network employs for identification of a subscriber of the subsystem a subscriber identity code converted from the second format to the first format and containing a system code indicating that the identity code belongs to a subscriber of the subsystem; the transmission network employs for authentication of a subscriber a pair of the first authentication parameter and the reference parameter, generated according to the authentication procedure of the transmission system, when a subscriber identity code belongs to a subscriber of the transmission system; the transmission network employs for authentication of a subscriber a pair of the first authentication parameter and the reference parameter, generated according to the authentication procedure of the subsystem, when a subscriber identity code belongs to a subscriber of the subsystem.

The invention also relates to a telecommunication system comprising a transmission network having subscriber identity codes of a first format and a first subscriber authentication procedure and at least one exchange; a subsystem connected to said exchange and having subscriber identity codes of a second format and a second subscriber authentication procedure, the calls of the subscribers of the subsystem being routed through the transmission network and said exchange. According to the invention the system is characterized in that the parameter generation algorithms of both the first and the second authentication procedure are located in an authentication means of the transmission network, the proper algorithm for each subscriber to be authenticated being selectable on the basis of the type of the subscriber.

In the invention the subsystem subscriber is authenticated by the transmission system virtually in the same way as the subscriber of the transmission network itself except that the transmission network generates subscriber authentication parameters by different authentication algorithms, depending on whether the subscriber is a subsystem subscriber or a transmission network subscriber. The authentication algorithms of both subscriber types are preferably stored in the authentication units of the transmission network, e.g. in an authentication centre, which reduces processing in the subsystem. The subsystem only transfers authentication requests and responses between the subscriber and the transmission system. In the internal messages and internal functions of the transmission system, the identity of the subsystem subscriber is a subscriber identity code converted so as to comply with the numbering scheme of the transmission network. The identification of the subscriber type and the selection of the appropriate algorithm take place on the basis of a subsystem code contained in the converted subscriber identity. The subsystem authentication data is preferably transferred in the transmission network by utilizing the standard messages and information elements of the transmission system; the subsystem data is incorporated in the existing information elements without changing the format of the element or the structure of the message. In this way, no modifications are required in the transmission system protocols.

BRIEF DESCRIPTION OF THE DRAWINGS

In the following the invention will be described in more detail by means of illustrating embodiments with reference to the attached drawings, in which.

DETAILED DESCRIPTION OF THE INVENTION

Figure 1:
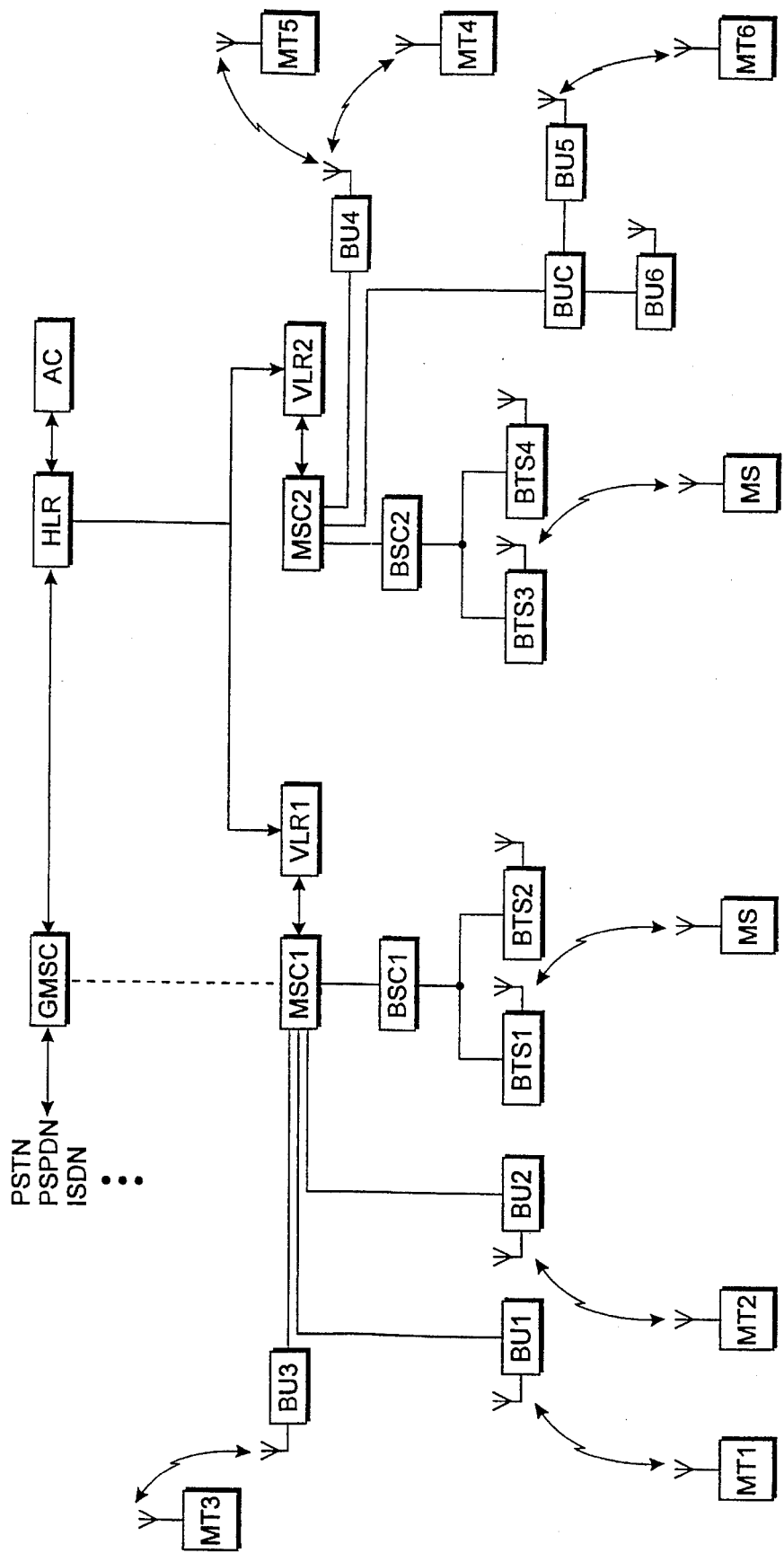
FIG. 1 is a block diagram illustrating a cellular mobile radio system in which the method according to the invention can be applied.

In the following the invention will be described by means of an example in which a digital cordless telephone system CT2 is integrated in a digital radio telephone system GSM, which is the primary application of the invention. The method according to the invention can, however, also be applied on connecting other cordless telephone systems, such as DECT (Digital European Cordless Telecommunications), to the GSM or its modifications or to other similar mobile radio systems or switched transmission networks.

The basic structure and basic functions of the GSM mobile radio system are well-known to one skilled in the art and relatively accurately defined in the specifications of the GSM system. A reference is also made to *The GSM System for Mobile Communications*, M. Moyly and M. B. Paulet, Palaiseau, France, 1992; ISBN 2-9507190-0-7. In the following a few basic concepts and elements of the GSM system will be defined with reference to FIG. 1. An area within which the GSM mobile radio services are available is called a GSM network (GSM service area), which may cover several countries. The GSM network may be divided into national GSM networks (PLMN service area), i.e. areas covered by one operator offering GSM services. There may also be several GSM networks in the same country and the areas covered by them may overlap geographically. In the text below, the GSM network primarily refers to such a "national" network.

The GSM network may comprise one or more MSC areas, i.e. areas within which services are provided by a single mobile services switching centre MSC (mobile exchange). The MSC area, in turn, may contain one or more location areas each covered by one or more radio cells. The cell is the smallest graphical area of the system, comprising one or more fixed radio stations, i.e. base stations, and using predetermined radio channels for communication.

The GSM network comprises at least one home location register (HLR), which is a data base in which subscriber data, such as location data, are stored permanently. The HLR also has an associated authentication centre, which may be integrated or separate. The authentication centre contains subscriber authentication data and authentication algorithms. The system also comprises several visitor location registers (VLR) each associated with one or more MSC areas. However, each MSC area has a single VLR. The VLR is a data base in which subscriber data are stored while the mobile station MS visits the area of the VLR. The VLR stores information of the location of the mobile station MS, normally with the accuracy of one location area. The HLR, in turn, stores information of the VLR that the mobile radio visits and it provides routing data for routing mobile stations MS terminating calls in the network. The HLR, in turn, receives the required routing data from the VLR. The HLR and the VLR have only a signalling connection to the other components of the mobile radio network.

Within the GSM network the subscriber identification is based on the International Mobile Subscriber Identity IMSI, which comprises a GSM Mobile Country Code MCC (three digits), a Mobile Network Code MNC (2 digits) of the national GSM network, and a Mobile Station Identification Number MSIN (ten digits). The MSIN is unique within a certain national GSM network and can be specified by the network operator.

In the example of FIG. 1, each MSC area has a dedicated visitor location register VLR associated with the mobile exchange MSC of the of the respective MSC area.

FIG. 1 illustrates two MSC areas, one with a MSC1 and a VLR1 and the other with a MSC2 and a VLR2 for the traffic control. There are one or more location areas under the MSC area covered by the MSC1 and MSC2, respectively, and each location area comprises a base station controller BSC1 and BSC2, respectively, which controls several fixed radio stations, i.e. base transceiver stations BTS. Each radio cell comprises one BTS, and one base station controller BSC provides services for several cells. A mobile station MS located in the cell establishes a two-way radio link to the BTS of the cell. Both a signalling connection and speech channels are provided between the BSC and the MSC.

The GSM network is usually connected to other networks, such as the public telephone network (PSTN), another mobile network (PSPDN) or an ISDN network through a MSC called a gateway MSC.

According to the invention the cordless telephone system CT2 is integrated as a subsystem for the GSM system e.g. by connecting CT2 base stations BU under the control of the MSC. In FIG. 1, the CT2 base stations BU1, BU2 and BU3 are connected to the MSC1, and the CT2 base stations BU4 and BU5 are connected to the MSC2. The CT2 base station controller BUC is also connected to the MSC2. In practice, the BUC may be e.g. a telephone exchange PABX operating in compliance with the CT2 specification and controlling base stations BU5–BU6. The mobile services switching centres MSC and the CT2 base stations BU and base station controllers BUC are provided with suitable additional equipment and software for combining the mobility functions of the systems and for matching the numbering schemes of the systems.

In principle, the GSM transmission network may handle CT2 subscribers similarly as actual GSM subscribers although the CT2 and GSM systems are fully separate radio systems at least on the radio path level.

The CT2 system and the GSM system, however, have completely different numbering schemes, and so the CT2 subscriber identity codes cannot be used as such in the GSM network.

In the CT2 system the CT2 terminal equipment identity code is a binary 27-bit PID (Portable Identity Code) which, in turn, comprises two portions: an 8-bit MIC (Manufacturer Identity Code) and a 19-bit HIC (Handset Identity Code). This code is used in compliance with the CT2 Common Air Interface (CAI) specification over the radio path between the CT2 base station BU and the CT2 terminal equipment MT. The CAI specification is described e.g. in *CT2 Common Air Interface*, M. W. Evans, British Telecommunications Engineering, Vol. 9, July 1990, p. 103–111.

According to the invention, each CT2 terminal equipment is assigned another subscriber identity code for the GSM system, which identity code corresponds to the GSM IMSI. This identity code has to be unique in the GSM network, and it has to be convertible into a CT identity code and again restored at all interfaces between these systems.

Figure 2:
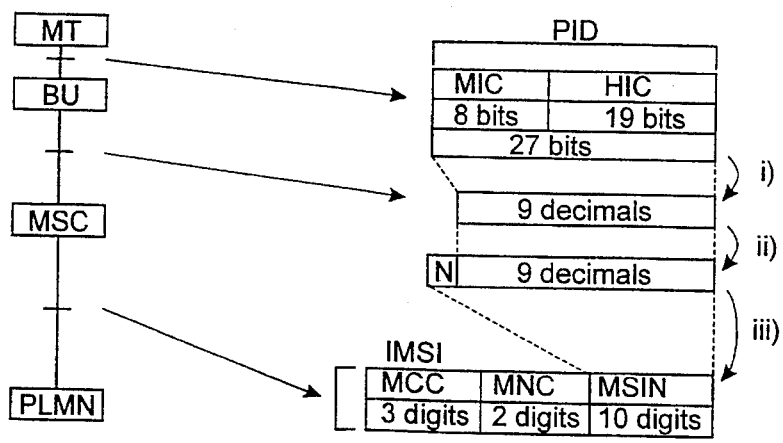
FIG. 2 is a flow and block diagram illustrating the numbering scheme conversion method according to the invention in the system of FIG. 1.

Such an identity conversion is described in FI Patent Application 914655, which is hereby in Patent corporated by reference. In the following the conversion of the PID into the IMSI (PID/IMSI conversion) according to the invention will be described briefly with reference to FIG. 2: i) A 27-bit binary PID is converted into a decimal number (maximum value 134217727), which requires no more than 9 decimals. ii) A CT2 system identity number N, by means of which the GSM system is able to distinguish a CT2 subscriber from GSM subscribers, is added at a desired position to the 9-decimal number, as the most significant number. This results in a 10-number decimal number which forms an MSIN complying with the GSM specifications. iii) The network code MNC and the country code MCC are added in front of the MSIN, thus obtaining an IMSI complying with the GSM specifications, which can be used as such as a CT2 terminal equipment identity code in the GSM network. The IMSI is converted into the PID (IMSI/PID conversion) by performing the inverse conversions of the conversions i–iii in reverse order.

The final IMSI is always formed at the latest in the MSC, so that the IMSI is used for the CT2 terminal equipment everywhere in the GSM network outside the MSCs. On the other hand, the PID is always used over the radio path between the BU and the MT. The functions required for the PID/IMSI and IMSI/PID conversions can, in principle, be distributed in any way between the BU or BUC and the MSC.

The subscriber identity code may herein refer to either a subscriber specific identity code or to a terminal equipment specific identity code, depending on the systems to be integrated in each particular case.

Another problem with the interconnecting of the CT2 and GSM systems is that the systems employ different authentication parameters for subscriber identification.

In the CT2 system the authentication is based on the use of a PIN parameter which is stored internally in the CT2 telephone. In the authentication the base station BU compares the PIN parameter from the CT2 telephone MT with the actual PIN parameter of the telephone MT. For safety reasons, the PIN parameter is encrypted for the transmission over the radio path. The CT2 authentication will be described below with reference to FIG. 3.

A random number generator 31 of the base station BU generates a 32-bit random challenge RAND (point 32) and sends it in a message AUTH-REQ to a CT2 telephone MT where it is received in the form RAND' (point 32A). The CT2 telephone MT derives a 32-bit CPIN parameter (point 35) from a 64-bit PIN parameter and the parameter RAND' by an encryption algorithm F (point 34). The CPIN parameter is then sent in a message AUTH-RES to the base station BU, which receives it in the form CPIN' (point 35A). The base station BU deduces the value of a parameter E-PIN (expected-PIN) associated with the telephone MT by means of identification information (point 37) and calculates the value of a parameter E-CPIN (expected CPIN) (point 31) from the parameters E-PIN and RAND by means of the algorithm F (point 38). The BU compares the obtained value CPIN' with the value E-CPIN and if the values are equal, the authentication has been accomplished properly.

In the GSM system, the MSC may request authentication parameters for each subscriber MS from the lauthentication centre AC of the subscriber's MS home network by sending a message SEND-PARAMETERS. The authentication centre is either a separate unit or integrated in the HLR, as illustrated in FIG. 1. The authentication centre AC selects a subscriber specific authentication key $K_i$ on the basis of the subscriber identity code IMSI contained in the message SEND_PARAMETERS. In addition, a random number generator 42 generates a plurality of random number parameters RAND (point 43), from which and the key $K_i$ a reference parameter SRES is derived by an authentication algorithm A3 (point 44) for each parameter RAND (point 45). The authentication centre AC sends these RAND/SRES pairs in a message SEND_PARAMETERS to the VLR, in which they are stored in a subscriber specific RAND/SRES table (point 46).

When the VLR authenticates the subscriber identity code, it selects a value for the parameter RAND from the RAND/SRES table of this subscriber and sends the value in a message AUTHENTICATE to the MSC, which forwards it in a message AUT_REQUEST to the subscriber MS (point 47). The subscriber MS comprises the same authentication key $K_i$ and authentication algorithm A3 as those used in the authentication centre AC. The subscriber MS calculates the parameter SRES (50), which is the authentication response of the MS, by utilizing the parameter RAND received by it (point 47), the key $K_i$ (point 48) and the algorithm A3 (point 49). The MS returns the parameter SRES to the MSC in a message AUT_RESPONSE, and the MSC forwards it in a message AUTHENTICATION_RESPONSE to the VLR. The VLR compares (point 52) the value SRES sent by the MS with the stored value SRES (point 51), and if they are equal, the authentication has been accomplished properly.

The above-described authentication procedures of the CT2 and GSM systems cannot be altered or integrated so as to achieve compatibility. This is due to the randomness of the identification responses E-PIN, CPIN and SRES to be calculated by the authentication algorithms F and A3, wherefore the algorithms do not yield linear results. In order to accomplish proper authentication between a CT2 subscriber and the GSM transmission network, the transmission network also has to be able to perform the authentication procedure in compliance with the CT2 system.

Figure 3:
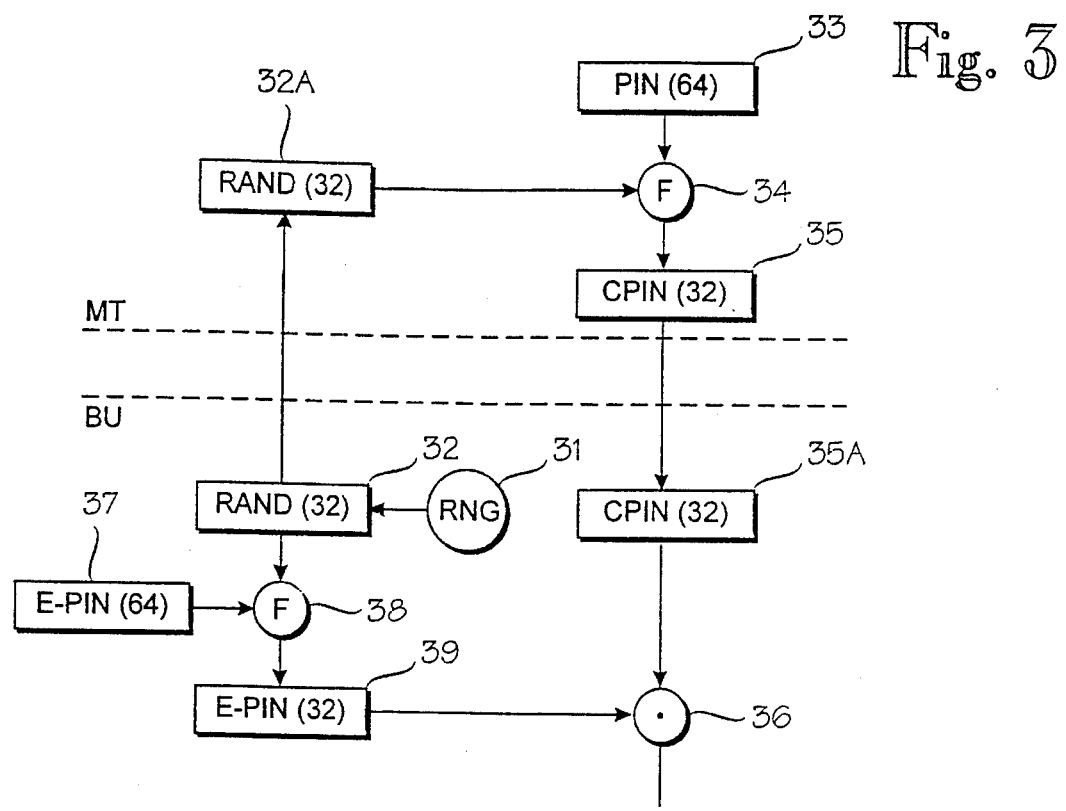
FIG. 3 is a flow and signalling diagram illustrating the authentication procedure according to the CT2 system.

In the invention, this is achieved by incorporating the CT2 authentication algorithm F, the random number generator 31 and the algorithm 37 for deriving the parameter E-pin, located in the base station BU in FIG. 3, in the authentication centre AC of the GSM system. The AC is capable of selecting the appropriate authentication algorithm on the basis of the subscriber identity code of the subscriber to be identified. CT2 subscribers, for instance, can be distinguished from ordinary GSM subscribers by means of a CT2 specific decimal number N contained in the MSIN field of the IMSI code assigned to the CT2 subscriber, as described above with reference to FIG. 2. In addition to the CT2 authentication algorithm, it is possible that the authentication centre AC also comprises a table containing the authentication algorithms and random number generators of other subsystems that may be connected to the GSM transmission network. Accordingly, an appropriate one of the authentication algorithms can be selected for each subscriber type on the basis of the subscriber identity code, and the authentication parameters generated by each authentication algorithm are transferred to the VLR. The selection of the authentication algorithm does not affect the signalling protocol or the structure of messages in the GSM system but CT2 specific authentication data is transferred in the GSM network by standard GSM messages and information elements without changing the format of the information elements or the message format. As CT2 data is typically shorter than GSM data, the unoccupied space of the GSM information elements is filled with zeros in conjunction with CT2 data.

The authentication of a CT2 subscriber in the GSM system in accordance with the invention will be described below by way of example. Table I lists the messages, functions, protocol types and information elements used in FIG. 5. The table also refers to the page number of the respective GSM or CT2 specification so that B refers to the GSM specification 09.02, and E or A refers to the CT2 specification ETSI TC/RES I-ETS.

Figure 5:
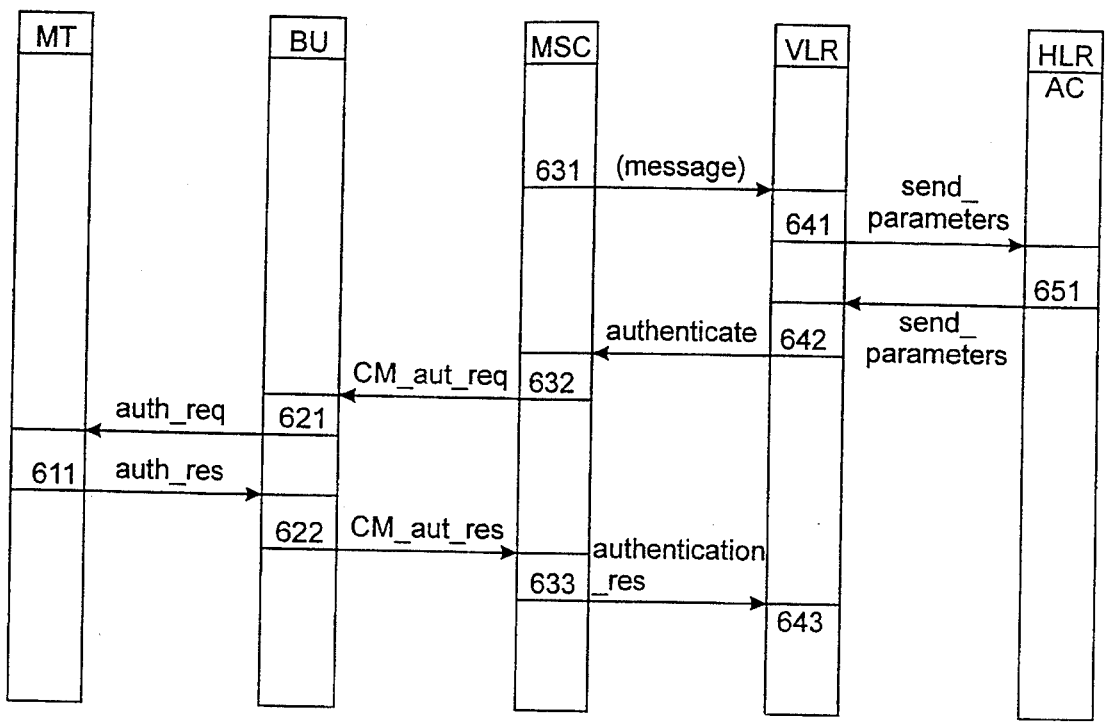
FIG. 5 is a signalling diagram illustrating an authentication procedure of a CT2 system integrated in a GSM system.

Referring to FIG. 5 and Table I, the authentication according to the invention will be described by dividing it into the functions 631, 641, 651, 542, 532, 621, 611, 622, 633 and 643.

631) The MSC initiates the authentication by sending the VLR one of the MAP messages used for starting authentication. This message may be e.g. PRO_ACC_REQ. An appropriate authentication algorithm is selected on the basis of the subscriber type. The subscriber type is determined by analyzing the IMSI code.

Figure 4:
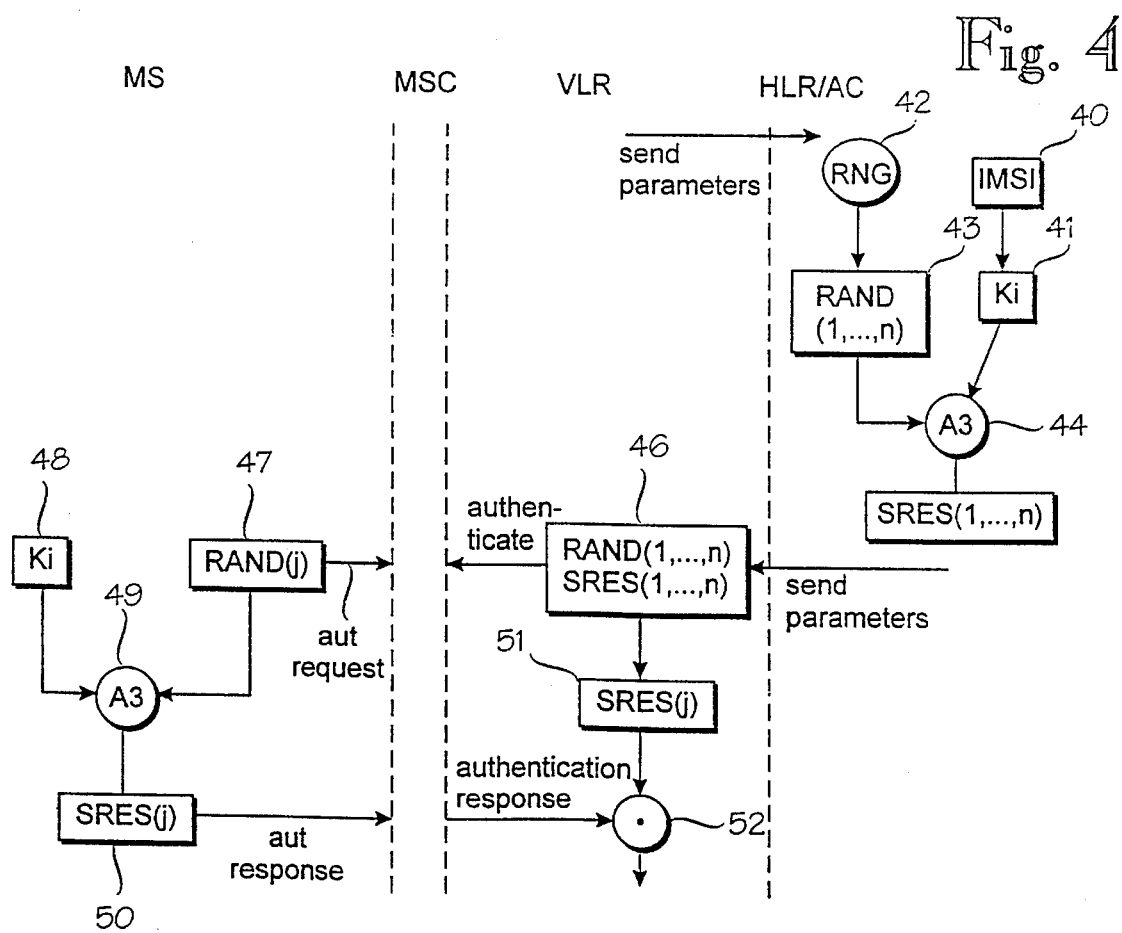
FIG. 4 is a flow and signalling diagram illustrating the authentication procedure according to the GSM system.

641) After having received the authentication initiation message, the VLR may, if required, request the authentication centre AC of the HLR to send authentication parameters. However, this is not always necessary. If the VLR has a sufficient number of stored authentication parameters left from the previous request (cf. FIG. 4), it does not need to request more parameters. Such a request is made by sending the message SEND_PARAMETERS to the HLR/AC. This message consists of the Request Parameter information elements and complies with the MAP protocol. It contains the following parameters: REQUEST, IMSI, AuthenticationSet, SubscriberData, CUG information and $K_i$. When the message is sent, the timer having a timing period of 15 to 30 seconds is started. The timer is stopped when the message SEND_PARAMETER is received.

651) On receiving the message SEND_PARAMETERS the authentication centre of the HLR analyses the IMSI code of the subscriber to find out whether CT2 specific or GSM specific data is required. For a CT2 subscriber, a CT2 specific authentication algorithm is used to perform a calculation operation after which the HLR/AC returns the requested parameter results in the message SEND_PARAMETERS. This message complies with the MAP protocol. The requested parameters may be IMSI, AuthenticationSet, SubscriberData, CUG information and the key $K_i$.

AuthenticationSet=SEQUENCE[RAND, CPIN, $K_C$].

RAND is a random number used in the authentication. It is CT2 specific and shorter than the GSM specific random number RAND.

CPIN is a 32-bit result of the CT2 algorithm performed by the AC of the subscriber, corresponding to the parameter E-CPIN of FIG. 3.

$K_C$ is an encryption key; it is not used in this specific case.

642) After having received the message SEND_PARAMETERS the VLR initiates the authentication procedure by sending the message AUTHENTICATE to the MSC. The message complies with the MAP protocol. It contains the information elements RAND and cksn. Cksn stands for an encryption key sequence number which is not used in the CT2 authentication procedure as it is not relevant to the CT2 system. On transmitting this message, the VLR starts a T-aut counter the time value of which is 5 to 10 seconds. The timer is stopped when the VLR receives the message AUTHENTICATION_RES.

632) The MSC maps the message AUTHENTICATE so that it complies with the MM' protocol and transfers a message CM_AUT_REQ to the CT2 base station BU. This message has to contain the parameter RAND as well.

621) The base station BU maps the message CM_AUT_REQ in the message AUTH_REQ, which complies with the protocol format of the layer 3 of the CT2 system. This authentication request information element comprises two parameters, RAND and INCZ. The message AUTH_REQ is sent to the telephone MT.

611) The telephone MT receives the message AUTH_REQ and performs the required authentication algorithms. Then it responds with the message AUTH_RES, which complies with the CT2 protocol. This authentication response information element contains three parameters, CPIN, ZAP and TRD.

ZAP represents the content of a 4-bit ZAP field stored in the mobile telephone MT. The operator may use it as part of the overall authentication process of the telephone MT. When the INCZ of the received message AUTH_REQ is set to one, it causes the MT to increment the content of the 4-bit ZAP field (modulo-16). When the INCZ is set to zero, the field remains unchanged.

The TRD field is used to transfer charging data associated with the CT2 system. The use and interpretation of data in this field can be selected by the operator. The TRD is an optional field of variable length, which may contain 23 BCD numbers.

622) On receiving the message AUTH_RES the base station BU maps the message in the message CM_AUT_RES, which is sent to the MSC. The last-mentioned message complies with the MM' protocol and it has to contain the CT2 specific CPIN parameter.

633) The MSC receives the message CM_AUT_RES and maps it in the message AUTHENTICATION_RES complying with the MAP protocol. The AUTHENTICATION_RES contains said calculated authentication parameter CPIN and is sent to the VLR.

643) The VLR compares the received authentication parameter CPIN with its internal parameter CPIN, which is calculated and sent to the VLR by the AC. If the parameters are equal, the authenticity of the MT has been proved.

In place of storing and performing the algorithms merely in the authentication centre AC, at least part of the authentication algorithms may be located in and performed by the VLR, whereby the authentication centre AC sends the VLR only the encryption key $K_i$ in the message SEND_PARAMETERS. This is another way of processing the identification key specified in the GSM network, which, however, is not as safe as that described by way of example, as the key $K_i$ transferred to and known at several different locations in the network.

The authentication algorithms and functions may also be distributed in another way in the GSM network, though it may thereby be necessary to deviate from the specifications of the GSM network.

The attached figures and the description related to them are only intended to illustrate the present invention. In its details, the method and system according to the invention may vary within the spirit and scope of the attached claims.

TABLE I

| Name of Message | Function Number | Type of Protocol | Information Elements | References |
|---|---|---|---|---|
| [Message] | 641 | MAP | — | — |
| SEND-PARA-METERS | 651 | MAP | REQUEST: IMSI, Authentication-Set, Subscriber-Data, CUG-Information, Ki | Bp300, 463 |
| SEND-PARA-METERS | 642 | MAP | IMSI, AuthenticationSet, SubscriberData, CUG-Information, Ki | Bp300, 463 |
| Authenticate | 632 | MAP | RAND, cksn | Bp300, 422 |
| CM-AUT-REQ | 621 | MM' | RAND | — |
| AUTH-REQ | 611 | CT2/layer3 | RAND, INCZ, Auth-no | Ap3-18, Ep70 |
| AUTH-RES | 622 | CT2/layer3 | CPIN, ZAP, TRD, OPSIC, TCOS | Ap3-19, Ep71 |
| CM-AUT-RES | 633 | MM' | CPIN | — |
| AUTHEN-TICATION-RES | 643 | MAP | CPIN | Bp292, 422 |

I claim:

1. A subscriber authentication method in a telecommunication system comprising a transmission network having subscriber identity codes of a first format, a first subscriber authentication procedure and at least one exchange; a subsystem connected to said exchange and having subscriber identity codes of a second format and a second subscriber authentication procedure, the calls of the subscribers of the subsystem being routed through the transmission network and said exchange, said method comprising the steps of:

sending by the transmission network an authentication message containing a first authentication parameter to the subscriber through a said exchange;

generating by the subscriber a second authentication parameter in response to the received first authentication parameter and sending it through said exchange as an authentication response to the transmission network;

comparing by the transmission network the second authentication parameter generated by the subscriber with a corresponding reference parameter and considering the subscriber as correctly authenticated if the second authentication parameter and the reference parameter are equal;

employing by the transmission network for identification of a subscriber of the subsystem a subscriber identity code converted from the second format to the first format and containing a system code indicating that the identity code belongs to a subscriber of the subsystem;

employing by the transmission network for authentication of a subscriber a pair of the first authentication parameter and the reference parameter, generated according to the authentication procedure of the transmission system, when a subscriber identity code belongs to a subscriber of the transmission system; and employing by the transmission network for authentication of a subscriber a pair of the first authentication parameter and the reference parameter, generated according to the authentication procedure of the subsystem, when a subscriber identity code belongs to a subscriber of the subsystem.

2. The authentication method according to claim 1, further comprising the step of:

transferring said converted subsystem subscriber identity code and said authentication parameters in the transmission network in authentication messages of the transmission network.

3. The authentication method according to claim 1, further comprising steps of:

transmitting by the exchange an authentication request containing the subscriber identity code of the subscriber to the authentication centre verifying by the authentication centre on the basis of said system code whether the subscriber identity code is a subsystem subscriber identity code or transmission network subscriber identity code:

sending by the authentication centre an authentication message to the exchange, the authentication message containing the first authentication parameter generated by the authentication algorithm of the transmission network if the subscriber identity code of the authentication request is a transmission network subscriber identity code, or generated by the authentication algorithm of the subsystem if the subscriber identity code of the authentication request is a subsystem subscriber identity code;

sending by the exchange the subscriber a second authentication request containing said first authentication. parameter;

generating by the subscriber a second authentication parameter on the basis of the received first authentication parameter, and sending the second authentication parameter as an authentication response to the exchange and further to the authentication means; and comparing by the authentication means the second authentication parameter generated by the subscriber with a corresponding reference parameter and if the parameters are equal, considering the subscriber as being correctly authenticated.

4. The authenticating method according to claim 3, wherein the transmission network is a cellular mobile network in which said authentication means comprise at least one authentication centre and a visitor location register associated with the exchange, said method further comprising:

upon receiving by the visitor location register of an authentication request from the exchange, sending by the visitor location register the authentication centre a parameter request containing the subscriber identity code;

verifying by the authentication centre whether the subscriber identity code is a transmission network identity code or a subsystem subscriber identity code and then performs, on the basis thereof, the transmission network or subsystem authentication algorithm, respectively, so as to generate at least one pair of the first parameter and the reference parameter for the subscriber;

sending by the authentication centre said at least one parameter pair to the visitor location register;

sending by the visitor location register the subscriber the first authentication parameter through the exchange; and comparing by the visitor location register the second authentication parameter generated by a remote station with a corresponding reference parameter and if the parameters are equal, the authentication has been accomplished properly.

5. The authentication method according to claim 4, further comprising the step of:

sending by the authentication centre to the visitor location register a plurality of subscriber specific parameter pairs which are stored in the visitor location register for subsequent authentications of the same subscriber.

\* \* \* \* \*